United States Patent
Nam et al.

(10) Patent No.: US 9,523,533 B2
(45) Date of Patent: Dec. 20, 2016

(54) REFRIGERATOR

(71) Applicant: SAMSUNG ELECTRONICS CO., LTD., Suwon-si, Gyeonggi-do (KR)

(72) Inventors: Jeong Man Nam, Gwangju (KR); Gi Joong Jeong, Gwangju (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

(21) Appl. No.: 14/969,982

(22) Filed: Dec. 15, 2015

(65) Prior Publication Data
US 2016/0097581 A1 Apr. 7, 2016

Related U.S. Application Data

(63) Continuation of application No. 14/847,417, filed on Sep. 8, 2015, which is a continuation of application
(Continued)

(30) Foreign Application Priority Data

Jul. 13, 2009 (KR) .................. 10-2009-0063642

(51) Int. Cl.
A47B 96/04 (2006.01)
F25D 25/02 (2006.01)
(Continued)

(52) U.S. Cl.
CPC ............ F25D 25/025 (2013.01); A47B 88/12 (2013.01); F16H 19/04 (2013.01); F25D 23/00 (2013.01);
(Continued)

(58) Field of Classification Search
CPC ............ F16H 19/04; A47B 2210/0048; A47B 2210/0075; A47B 2210/0078; A47B 67/04; A47B 88/12; F25D 2323/021; F25D 2323/025
(Continued)

(56) References Cited

U.S. PATENT DOCUMENTS 410,068 A 8/1889 Brown
466,069 A 12/1891 Baldwin
(Continued)

FOREIGN PATENT DOCUMENTS

DE 44 45 288 6/1996
EP 0 718 574 12/1995
JP 2001-224455 8/2001

OTHER PUBLICATIONS

Chinese Office Action issued Nov. 26, 2013 in corresponding Chinese Patent Application No. 201010227830.X.
(Continued)

Primary Examiner — Daniel J Troy
Assistant Examiner — Thomas M Ayres
(74) Attorney, Agent, or Firm — Staas & Halsey LLP

(57) ABSTRACT

A refrigerator includes a main body having a storage chamber; a first storage unit formed in the storage chamber, left and right side walls of the first storage unit having first roller supporting surfaces; and a second storage unit having first roller members mounted to a front region of the second storage unit on left and right sides thereof, the first roller members being seated on the first roller supporting surfaces of the first storage unit, a protrusion extending downwardly from a bottom surface of the second storage unit, and second roller members provided on both sides of the second storage unit to move along guide surfaces provided on an interior of the storage chamber. A lateral surface of the protrusion is configured to extend into and contact an interior surface of
(Continued)

the first storage unit to prevent the first roller members from laterally leaving the first roller supporting surfaces.

16 Claims, 11 Drawing Sheets

Related U.S. Application Data

No. 14/604,152, filed on Jan. 23, 2015, now Pat. No. 9,146,053, which is a continuation of application No. 14/513,638, filed on Oct. 14, 2014, now Pat. No. 9,146,052, which is a continuation of application No. 12/801,782, filed on Jun. 24, 2010, now Pat. No. 8,864,249.

(51) Int. Cl.
*A47B 88/12* (2006.01)
*F25D 23/02* (2006.01)
*F25D 25/00* (2006.01)
*F25D 23/06* (2006.01)
*F16H 19/04* (2006.01)
*F25D 23/00* (2006.01)
*A47B 67/04* (2006.01)

(52) U.S. Cl.
CPC ............. *F25D 23/02* (2013.01); *F25D 23/028* (2013.01); *F25D 23/066* (2013.01); *F25D 25/00* (2013.01); *F25D 25/005* (2013.01); *A47B 67/04* (2013.01); *F25D 2323/021* (2013.01)

(58) Field of Classification Search
USPC ........................................ 312/331, 402, 404, 334.27–334.43, 312/330.1, 334.44–334.47
See application file for complete search history.

(56) References Cited

U.S. PATENT DOCUMENTS

| | | |
|---|---|---|
| 618,957 A | 2/1899 | Kelly |
| 1,364,396 A | 1/1921 | Dierking et al. |
| 1,946,789 A | 2/1934 | Willy |
| 2,711,944 A | 6/1955 | Meek et al. |
| 2,843,441 A | 7/1958 | Jewell |
| 2,955,441 A | 10/1960 | Dahlgreen et al. |
| 3,014,774 A | 12/1961 | Grib et al. |
| 3,446,545 A | 5/1969 | Horlacher |
| 3,861,769 A | 1/1975 | Jenkins |
| 4,121,878 A | 10/1978 | Lokken |
| 4,770,475 A | 9/1988 | Peterman |
| 5,070,556 A | 12/1991 | Gloger |
| 5,718,083 A | 2/1998 | Dowdell, II |
| 5,918,959 A | 7/1999 | Lee |
| 6,142,596 A | 11/2000 | Carson |
| 6,641,239 B2 | 11/2003 | Kaiser |
| 7,380,410 B2 | 6/2008 | Rand et al. |
| 7,430,937 B2 | 10/2008 | Rotter et al. |
| 7,712,852 B2 | 5/2010 | Choi et al. |
| 7,740,331 B2 | 6/2010 | Koo |
| 8,864,249 B2 | 10/2014 | Nam et al. |
| 9,146,052 B2 | 9/2015 | Nam |
| 9,146,053 B2 | 9/2015 | Nam |
| 2005/0160854 A1* | 7/2005 | Rotter .................. F25D 25/025 74/422 |
| 2005/0168115 A1 | 8/2005 | Moon et al. |
| 2006/0218958 A1 | 10/2006 | Rand et al. |
| 2007/0018548 A1 | 1/2007 | Ertz et al. |
| 2008/0203875 A1 | 8/2008 | Lim et al. |
| 2008/0203878 A1 | 8/2008 | Lim et al. |
| 2010/0219730 A1 | 9/2010 | Watts et al. |
| 2011/0006656 A1 | 1/2011 | Nam et al. |

OTHER PUBLICATIONS

U.S. Office Action issued Jan. 5, 2012 in copending U.S. Appl. No. 12/801,782.
U.S. Office Action issued Jun. 5, 2012 in copending U.S. Appl. No. 12/801,782.
U.S. Office Action issued Dec. 5, 2012 in copending U.S. Appl. No. 12/801,782.
U.S. Office Action issued Jun. 14, 2013 in copending U.S. Appl. No. 12/801,782.
U.S. Office Action issued Dec. 13, 2013 in copending U.S. Appl. No. 12/801,782.
U.S. Notice of Allowance issued Jun. 16, 2014 in copending U.S. Appl. No. 12/801,782.
U.S. Office Action issued Mar. 2, 2015 in copending U.S. Appl. No. 14/513,638.
U.S. Notice of Allowance issued Jul. 15, 2015 in copending U.S. Appl. No. 14/513,638.
U.S. Office Action issued Mar. 2, 2015 in copending U.S. Appl. No. 14/604,152.
U.S. Notice of Allowance issued Jul. 16, 2015 in copending U.S. Appl. No. 14/604,152.
U.S. Appl. No. 14/847,417, filed Sep. 8, 2015, Jeong Man Nam, Samsung Electronics Co., Ltd.
U.S. Office Action dated Apr. 21, 2016 from U.S. Appl. No. 14/847,417.
Korean Office Action dated Jul. 20, 2016 from Korean Patent Application No. 10-2009-0063642, 5 pages.
Korean Office Action dated Sep. 23, 2016 from Korean Patent Application No. 10-2009-0063642, 7 pages.

* cited by examiner

REFRIGERATOR

CROSS-REFERENCE TO RELATED APPLICATIONS

This application is a continuation of U.S. application Ser. No. 14/847,417, filed on Sep. 8, 2015, which is a continuation of U.S. application Ser. No. 14/604,152, filed on Jan. 23, 2015, which is a continuation of U.S. application Ser. No. 14/513,638 filed on Oct. 14, 2014, which is a continuation of U.S. application Ser. No. 12/801,782 filed on Jun. 24, 2010, which issued as U.S. Pat. No. 8,864,249 on Oct. 21, 2014, which claims the benefit of Korean Patent Application No. 10-2009-0063642, filed on Jul. 13, 2009 in the Korean Intellectual Property Office, the disclosures of which are incorporated herein by reference.

BACKGROUND

1. Field

Embodiments of the present invention relate to a refrigerator having a first storage box in the form of a drawer inserted in and withdrawn from an inside of a freezing chamber and a second storage box disposed on the upper part of the first storage box, both of which are smoothly inserted and withdrawn.

2. Description of the Related Art

A refrigerator is an apparatus to preserve freshness of various groceries for a long time by supplying a cold air generated by a heat exchanger to a storage chamber sectioned into a freezing chamber and a refrigerating chamber.

Recently, in order to offer consumers various conveniences, it has been suggested to provide a refrigerator structured in a manner that the refrigerating chamber mainly used for a short-time preservation of beverage and food is disposed at an upper part thereof while the freezing chamber mainly used for a longtime preservation of frozen food is disposed at a lower part thereof.

The freezing chamber is mounted with a first storage box which receives foodstuffs to be preserved in a frozen state. The first storage box is usually fixed to a rear surface of a freezing chamber door and inserted and withdrawn like a drawer as the freezing chamber door is opened and closed.

In addition, a separate storage box, that is, a second storage box is mounted at an upper part of the first storage box also to receive foodstuffs. The second storage box has a relatively low utility owing to its short withdrawal distance. Accordingly, a method of withdrawing the second storage box needs to be improved.

SUMMARY

Therefore, it is an aspect to provide a refrigerator enabling storage boxes to be smoothly inserted to and withdrawn from a storage chamber thereof.

Additional aspects of the invention will be set forth in part in the description which follows and, in part, will be apparent from the description, or may be learned by practice of the invention.

In accordance with an aspect, a refrigerator includes a storage chamber, a door mounted at a front side of the storage chamber, a first storage box inserted and withdrawn like a drawer in association with the operation of the door, and a second storage box seated on an upper part of the first storage box to operate in a rolling motion, wherein the first and second storage boxes are equipped with a roller device to enable the rolling motion of the second storage box on the first storage box, and the roller device includes a first roller member mounted to the second storage box; a first roller supporting part formed at the first storage box to support a rolling motion of the first roller member thereon; a second roller member mounted to the first storage box to share the load of the second storage box together with the first roller member during insertion and withdrawal of the second storage box; and a second roller supporting part formed at the second storage box to support a rolling motion of the second roller member thereon.

The first roller member may be mounted at both front ends of the second storage box, and the first roller supporting part is mounted at both upper ends of the first storage box corresponding to the first roller members.

The second roller member may be mounted at an inner rear end of the first roller supporting part of the first storage box, and the second roller supporting part may be formed on a bottom surface of the second storage box corresponding to the second roller member.

The second roller supporting part may have a separation prevention rib to restrain the second storage box from moving in lateral directions while the second roller member is rolling along the second roller supporting part.

The refrigerator may further include a buffer member formed at a rear end of the first roller supporting part to restrict the rolling motion of the first roller member.

The refrigerator may further include a rail device provided on both sides of the first storage box to enable insertion and withdrawal of the first storage box.

The rail device may include rail housings mounted on both sides of an interior cabinet of the storage chamber and each equipped with a rack gear; static rails received in the rail housings; movable rails slid relative to the static rails; rail covers fixed to the movable rails while mounting the first storage box; and pinion gears meshed with the rack gears and fixed to the movable rails.

A connection bar may be interposed between the pinion gears to minimize the movement of the first storage box in the forward and the backward direction during insertion and withdrawal of the first storage box.

A gear tooth formed at a rear end of each of the rack gears may have a lesser height than the other gear teeth and may have any one of semicircular, triangular and cut shape.

Gear teeth formed at a rear end of each of the rack gears may have gradually decreasing heights toward the rear end of the rack gear.

In addition, an idle gear or a slip prevention rib may be formed at a rear end of each of the rack gears so as to prevent separation of the pinion gears.

A buffer projection may be formed at a rear part of the door so restrict a forward movement of the second storage box during the rolling motion of the second storage box.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
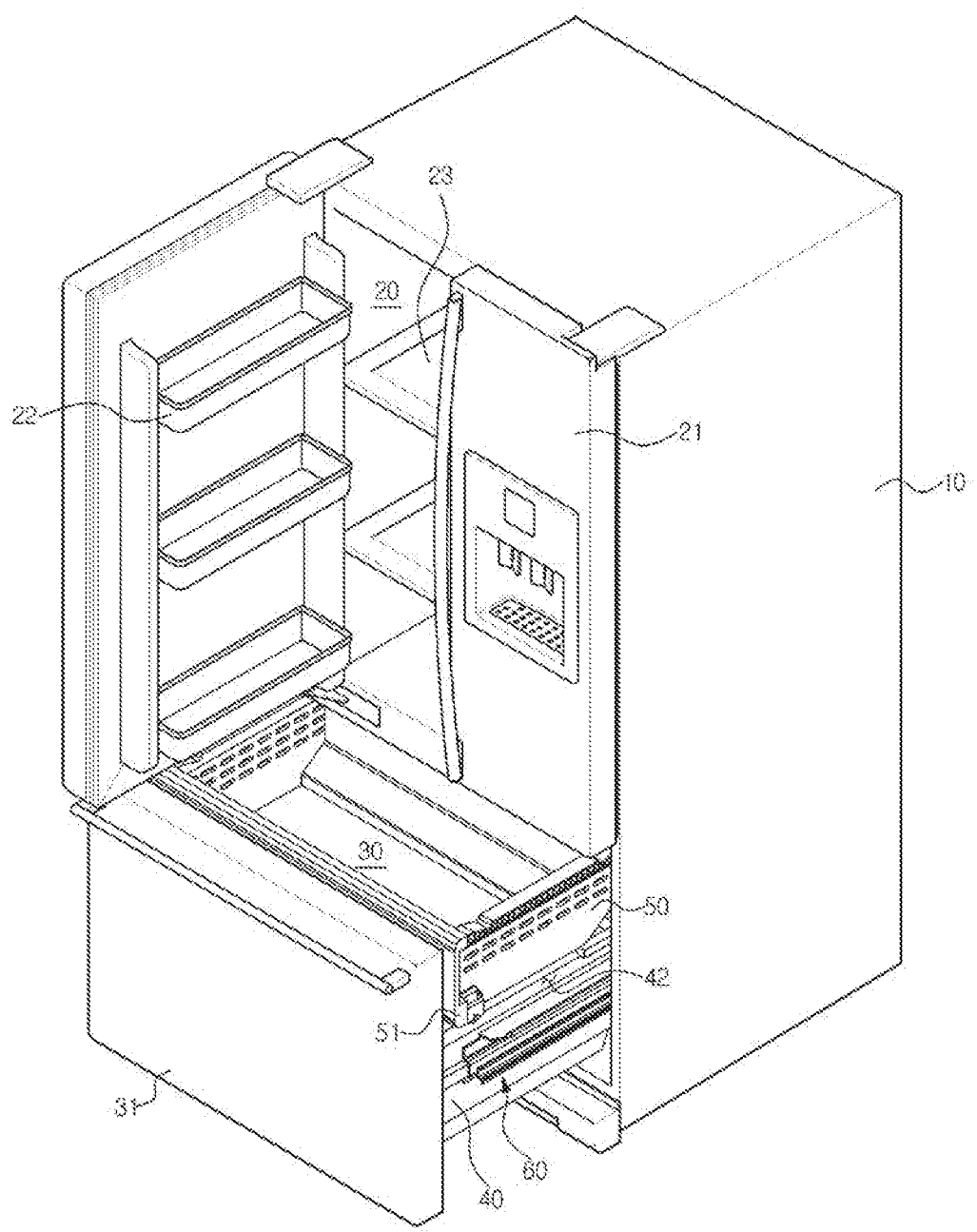
FIG. 1 is a perspective view of a refrigerator according to an embodiment.

Reference will now be made in detail to the embodiments of the present invention, examples of which are illustrated in the accompanying drawings, wherein like reference numerals refer to like elements throughout.

Figure 2:
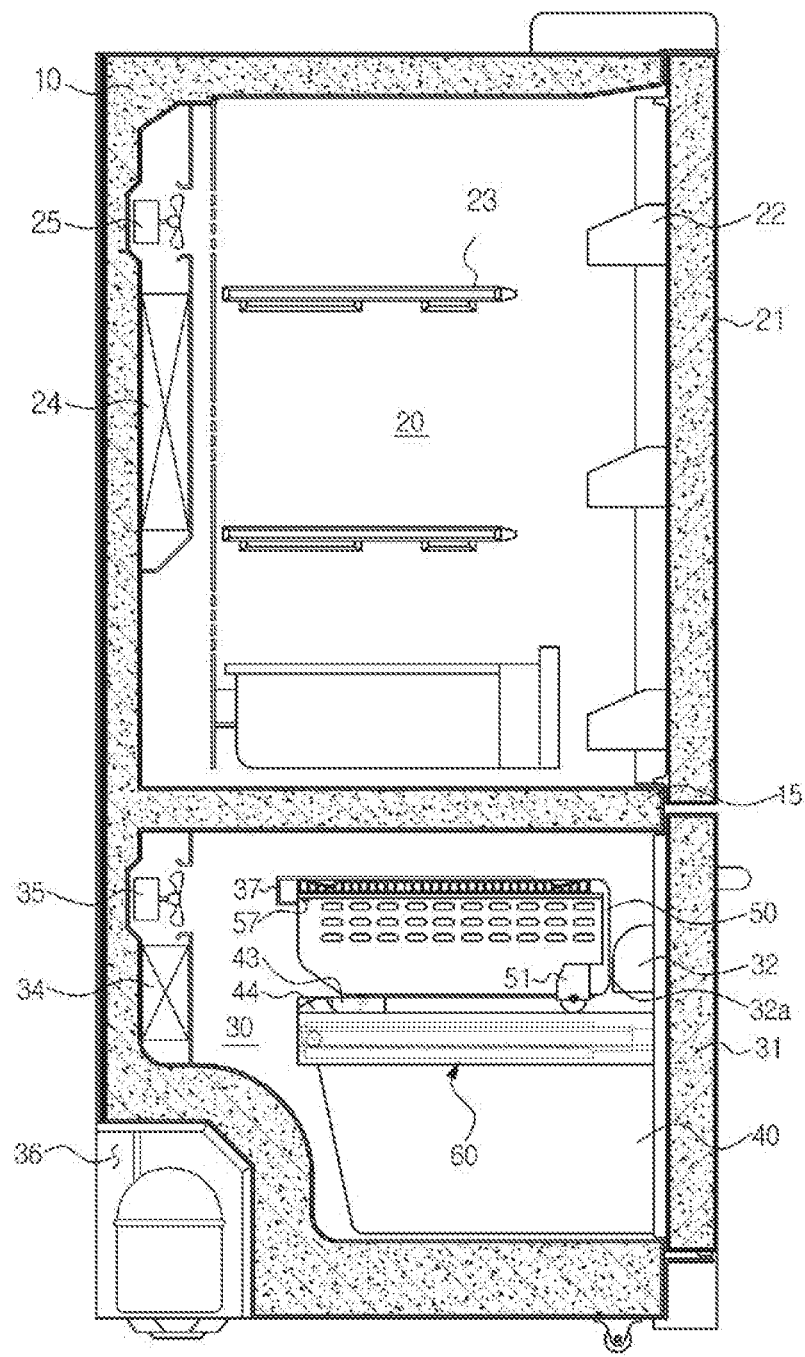
FIG. 2 is a sectional view of the refrigerator shown in FIG. 1.

Referring to FIG. 1 and FIG. 2, a refrigerator according to the embodiment includes a main body 10 constituting the exterior look of the refrigerator, and a storage chamber formed inside the main body 10 and opened to the front. The storage chamber may be divided into an upper space and a lower space by a partition 15. Usually, the upper space is used as a refrigerating chamber 20 while the lower space is used as a freezing chamber 30.

Heat exchangers 24 and 34 and ventilation fans 25 and 35 are mounted at rear parts of the refrigerating chamber 20 and the freezing chamber 30, respectively, in order to produce a cold air and supply the cold air separately to the refrigerating chamber 20 and the freezing chamber 30. In addition, a machine chamber 36 is provided at a rear lower part of the main body 10, including a compressor and a condenser to compress and condense a refrigerant and supply the refrigerant to the heat exchangers 24 and 34.

Doors 21 and 31 are mounted to front sides of the respective storage chambers 20 and 30 to selectively open and close the insides of the storage chambers 20 and 30. More specifically, the door 21 may be side-by-side doors pivotably connected at the left and the right of the front side of the refrigerating chamber 20. The freezing chamber door 31 may be a drawer-type door 31 withdrawn and inserted from and into the front side of the freezing chamber 30.

A plurality of guards 22 may be mounted to a rear surface of the refrigerating chamber door 21 in multiple layers for more convenient reception of foodstuffs. Also, a plurality of shelves 23 and receiving members in the form of a drawer, a basket or the like may be mounted in the refrigerating chamber 21.

A guard 32 is mounted to a rear surface of the drawer door 31. In addition, a first storage box 40 and a second storage box 50 are provided to the freezing chamber 30, which are inserted and withdrawn like a drawer according to opening and closing operations of the freezing chamber door 31. Here, the second storage box 50 is seated on an upper part of the first storage box 40 to operate in a rolling motion.

Figure 3:
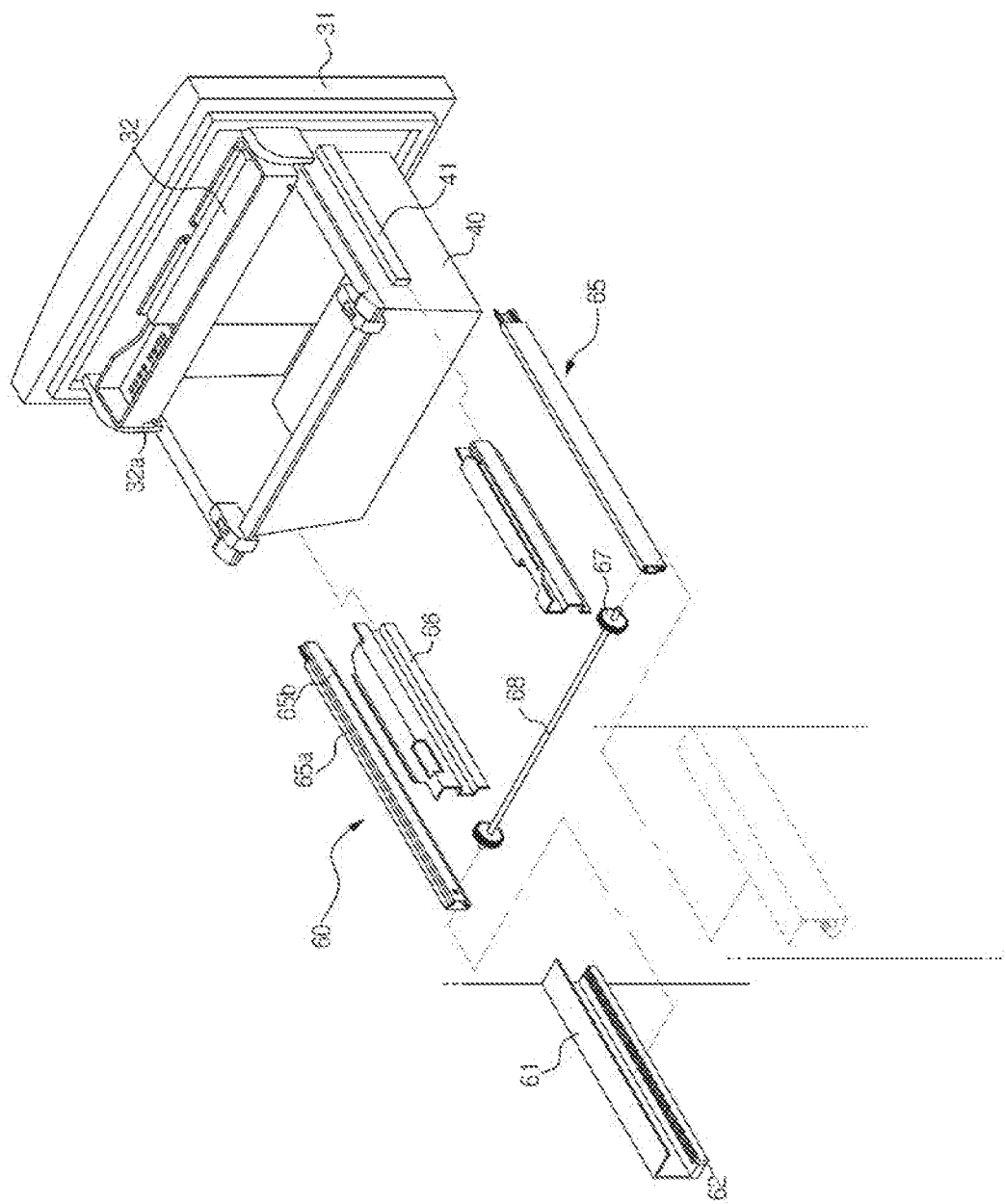
FIG. 3 is an exploded perspective view of a first storage box and a rail device employed in the refrigerator of FIG. 1.

As the freezing chamber door 31 is opened and closed, the first storage box 40 is withdrawn and inserted by a rail device 60 mounted at both lateral sides thereof. As shown in FIG. 3, the rail device 60 includes a pair of rail housings 61, rail units 65 received in the rail housings 61, and rail covers 66 fixed to part of the rail units 65 while mounting the first storage box 1.

Accordingly, the rail housings 61 are mounted on both sides of an interior cabinet of the freezing chamber 30 and receive the rail units 65.

A rack gear 62 is formed at a lower end of each of the rail housings 61. A pinion gear 67 is provided to move in mesh with an upper surface of the rack gear 62.

A connection bar 68 is linked between the pinion gears 67 of both sides as shown in the drawing. The connection bar 68 is adapted to restrain the first storage box 40 from moving forward and backward while being inserted and withdrawn.

Each of the rail units 65 includes a static rail 65a fixed to each rail housing 61, and a movable rail 65b slid along the static rail 65a. The static rail 65a and the movable rail 65b may be implemented by general rails performing a rolling motion by a bearing (not shown) provided therein and enabling insertion and withdrawal of the drawer-type door 31.

The pinion gear 67 meshed with the rack gear 62 formed at the rail housing 61 is fixed to the movable rail 65b. The rail cover 66 for mounting of the first storage box 40 is also fixed to the movable rail 65b. Additionally, a guide groove may be formed at the rail cover 66 to guide a guide projection 41 extended on both lateral sides of the first storage box 40.

While the pinion gear 67 is separated from and reset in the rack gear 62 according to insertion and withdrawal of the first storage box 40, an operation noise may be generated due to surface contact between the pinion gear 67 and the rack gear 62 according to shape of teeth of the gears 62 and 67.

To minimize such an operation noise, the embodiment improves the teeth of the rack gear 62 so that the pinion gear 67 and the rack gear 62 achieve line-contact or point-contact with each other while the pinion gear 67 and the rack gear 62 are being reset.

Figure 4A:
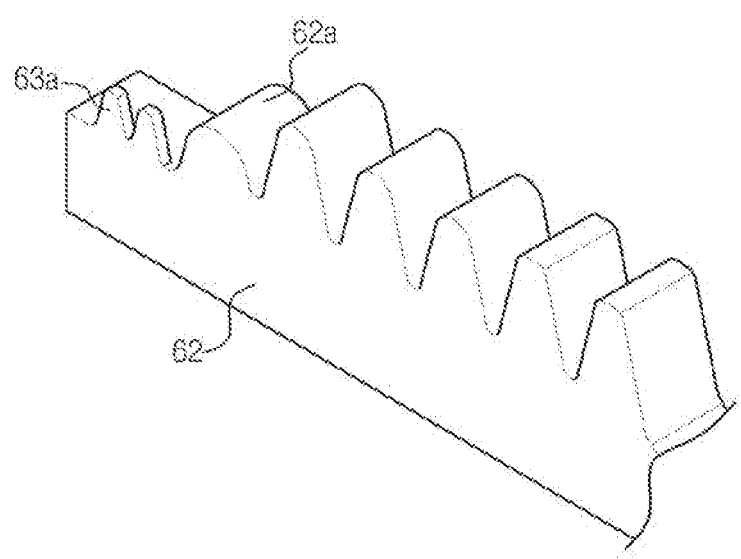
FIG. 4A to FIG. 4D are perspective views showing various versions of a rack gear of the rail device shown in FIG. 3.
Figure 4B:
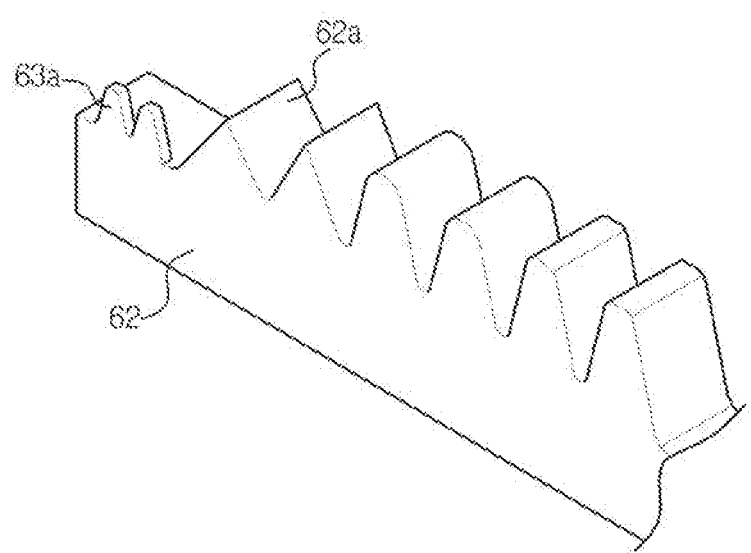
Figure 4C:
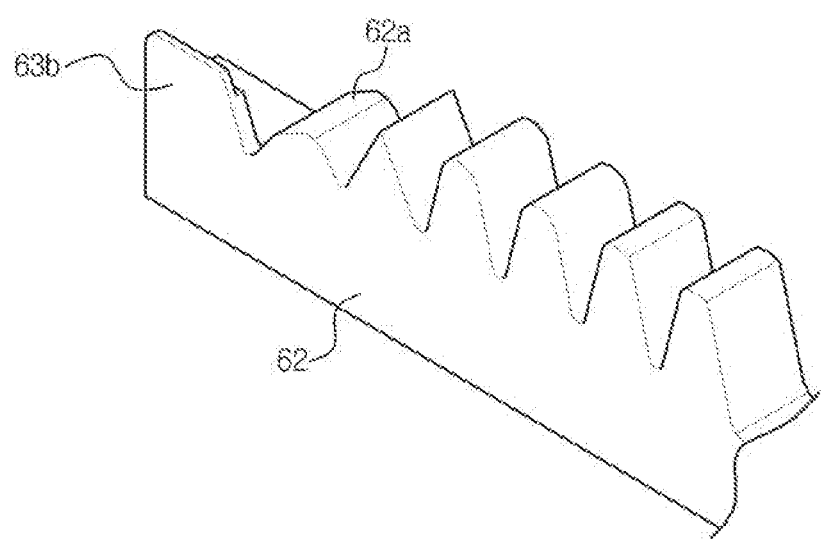
Figure 4D:
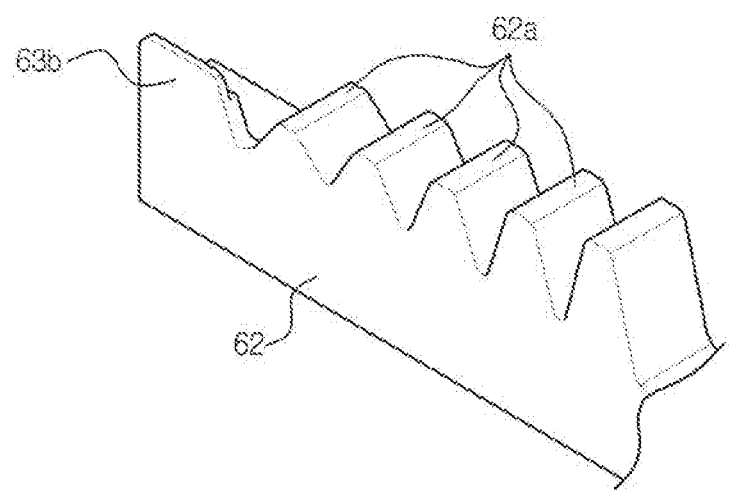

More specifically, the teeth of the rack gear 62 may be configured in a manner that a gear tooth 62a formed at a rear end of the rack gear 62 has a semicircular shape with a lesser height than the other gear teeth, as shown in FIG. 4A. The gear tooth 62a formed at the rear end of the rack gear 62 may have a triangular shape with a lesser height than the other gear teeth as shown in FIG. 4B. The gear tooth 62a may have a partially cut shape to be slanted as shown in FIG. 4C. A plurality of the gear teeth 62a may be formed to have gradually decreasing heights toward the rear end of the rack gear 62.

In case that the first storage box 40 is eccentrically inserted and withdrawn, one of the pinion gears 67 may be idly rotated. To this end, an idle gear 63a as shown in FIG. 4A or a slip prevention rib 63b as shown in FIG. 4B may be further provided at the rear end of each of the rack gears 62.

Figure 5:
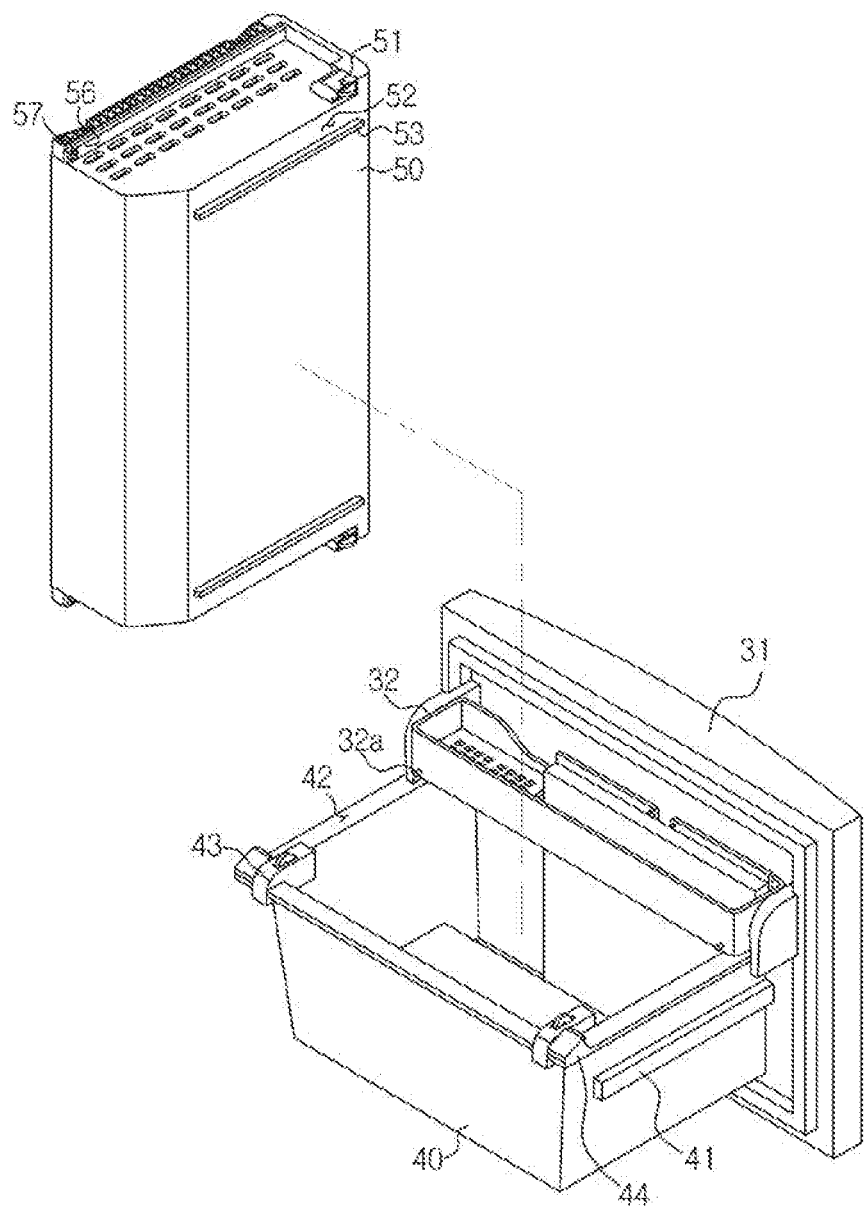
FIG. 5 is a perspective view showing the first storage box and a second storage box shown in FIG. 1.
Figure 6:
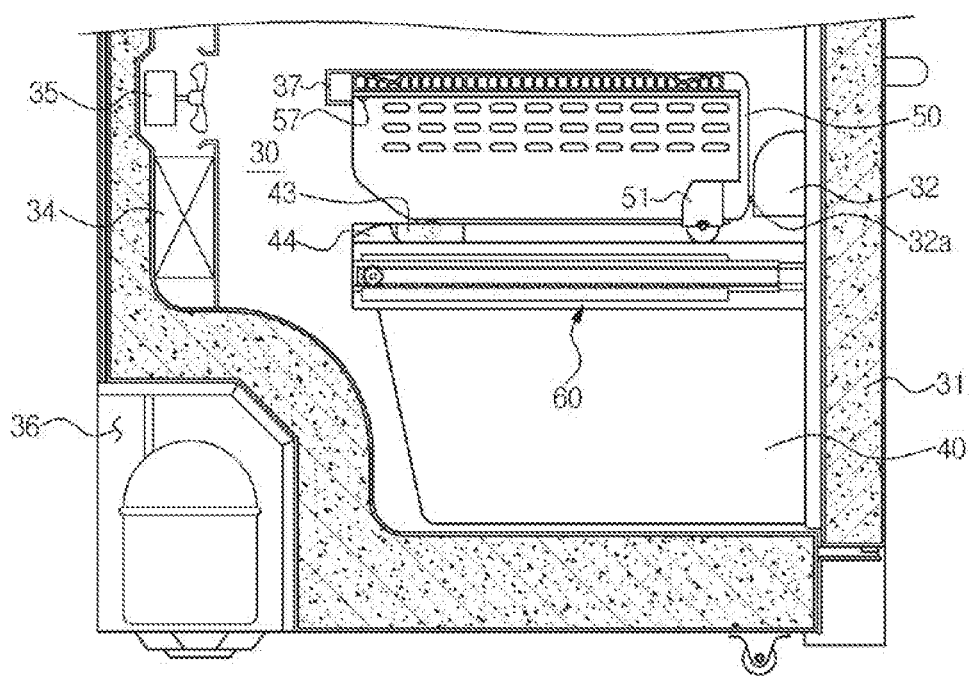
FIG. 6 to FIG. 8 are longitudinal sectional views showing sequential processes to withdraw the first and second storage boxes shown in FIG. 1.

As aforementioned, the second storage box 50 is seated and rolled on the upper part of the first storage box 40. For this, the first and second storage boxes 40 and 50 are equipped with a dedicated roller device enabling the rolling motion of the second storage box 50 on the first storage box 40, as shown in FIG. 5 and FIG. 6.

The roller device includes a first roller member 51 mounted to the second storage box 50, a first roller device having a first roller supporting part 42 formed at the first storage box 40 to seat the first roller member 51 thereon, a second roller member 43 mounted to the first storage box 40, and a second roller device having a second roller supporting part 52 formed at the second storage box 50 to seat the second roller member 43 thereon.

More particularly, the first roller member 51 is mounted at both front ends of the second storage box 50 whereas the first roller supporting part 42 is formed at both upper ends of the first storage box 40. While seating the respective first roller members 51 thereon, the first roller supporting parts 42 support the second storage box 50 and guide the rolling motion of the first roller members 51 during insertion and withdrawal of the second storage box 50.

Here, a buffering member 44 is formed at a rear end of each first roller supporting part 42 to restrict the rolling motion of each first roller member 51 so that the first roller member 51 cannot roll beyond a predetermined degree, as well as absorbing the rolling motion. An undescribed reference numeral 32*a* denotes a buffering projection that restricts a forward movement of the second storage box 50, while serving as a buffer between the guard 32 of the freezing chamber door 31 and the second storage box 50 during withdrawal of the second storage box 50.

The second roller member 43 is disposed at an inner rear end of each of the first roller supporting parts 42 to face a bottom surface of the second storage box 50. Since the second roller members 43 share the load of the second storage box 50 with the first roller members 51 during insertion and withdrawal of the second storage box 50, the second storage box 50 may be more smoothly moved forward and backward.

In addition, the second roller supporting part 52 is formed on both bottom sides of the second storage box 50, being each provided with a separate prevention rib 53 supporting each second roller member 43 to prevent the second storage box 50 from moving in lateral directions while the second roller member 43 is rolling along the second roller supporting part 52.

Also, a third roller member 57 is provided on both sides of the second storage box 50 to move along guide rails 37 formed in the interior cabinet of the freezing chamber 30 as the second storage box 50 is being inserted and withdrawn. More specifically, the third roller members 57 are mounted at front ends of flange parts 56 formed on both sides of the second storage box 50. Therefore, the third roller members 57 support the rear end of the second storage box 50 when only the first storage box 40 is withdrawn but the second storage box 50 is not withdrawn.

Hereinafter, the process of withdrawing the second storage box 50 according to the embodiment will be described.

Figure 7:
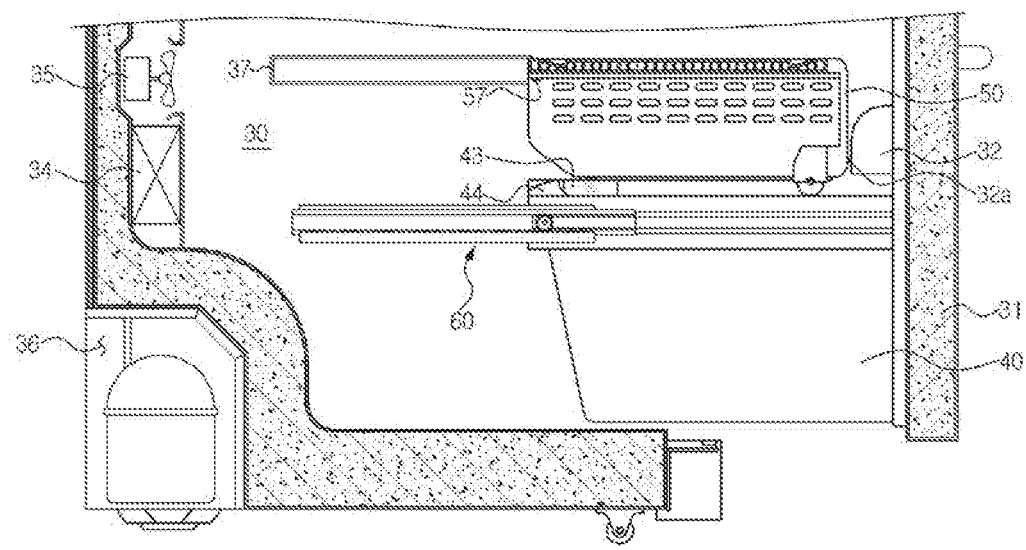

In order to withdraw the first and second storage boxes 40 and 50, first, the freezing chamber door 31 is pulled out to the front of the refrigerator so that the first storage box 40 is withdrawn as shown in FIG. 7. Here, the first storage box 40 is withdrawn by the rail device 60 mounted at the both sides of the first storage box 40.

As the freezing chamber door 31 is pulled to the front, the pinion gear 67 is operated, which is meshed with the rack gear 62 formed on the rail housing 61 of the rail device, thereby sliding the movable rail 65*b* fixed to the pinion gear 67 relative to the static rail 65*a*. When the movable rail 65*b* is thus slid from the static rail 65*a*, the rail cover 66 fixed with the movable rail 65*b* is moved. Accordingly, the first storage box 40 mounted to the rail cover 66 is withdrawn to the front.

Thus, the rail device is operated by the rack gear 62 of the rail housing 61 and the pinion gear 67 meshed with the rack gear 62 during insertion and withdrawal of the first storage box 40. Here, since the teeth structure of the rack gear 62 is improved to form line-contact or point-contact with the pinion gear 67, the operation noise may be prevented while the teeth of the pinion gear 67 are being separated from and reset in the teeth of the rack gear 67.

Furthermore, during insertion and withdrawal of the first storage box 40, the idle gear 63*a* or the slip prevention rib 63*b* formed at the rear end of the rack gear 62 may prevent separation of the pinion gear 67 and accordingly prevent idle rotation of the pinion gear 67.

When the first storage box 40 is withdrawn, the second storage box 50 seated on the upper part of the first storage box 40 is also withdrawn. When a user intends to put certain stuff in the first storage box 40 in this state, the second storage box 50 needs to be inserted into the freezing chamber 30.

Figure 8:
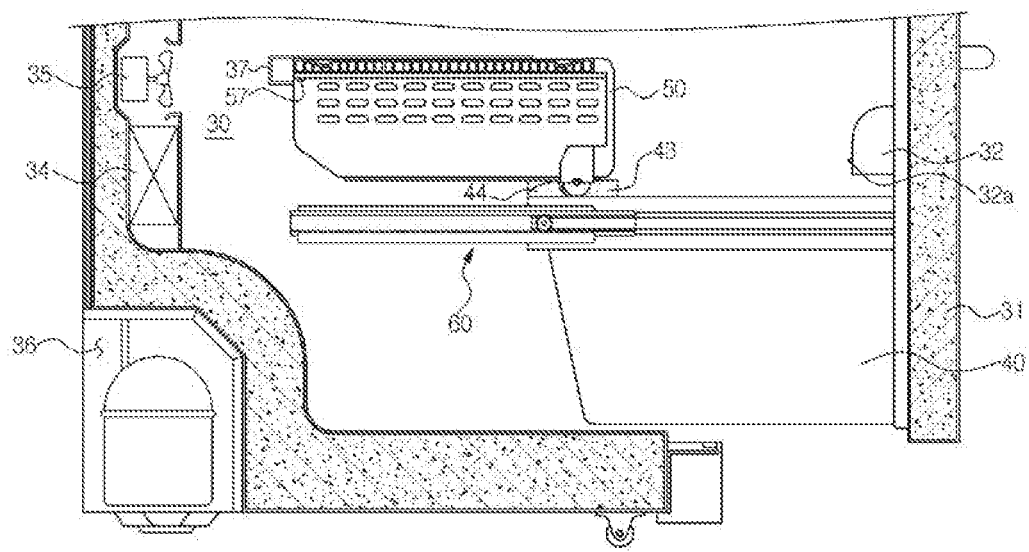

Insertion of the second storage box 50 may be achieved in the following manner as shown in FIG. 8. The first roller member 51 of the second storage box 50 is rolled along the first roller supporting part 42 formed at the first storage box 40. Simultaneously, the second roller member 43 of the first storage box 40 is rolled along the second roller supporting part 52 formed at the second storage box 50.

While the second storage box 50 is rolling on the upper part of the first storage box 40 by the roller device, the load of the second storage box 50 is distributed to the first roller member 51 of the second storage box 50 and the second roller member 43 of the first storage box 40. As a result, the second storage box 50 is smoothly rolled forward and backward.

As is apparent from the above description, a refrigerator according to the embodiment of the present invention enables smooth insertion and withdrawal of storage boxes by adopting a roller device and a rail device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A refrigerator comprising:
a main body including a storage chamber;
a rail housing mounted on a side wall of the storage chamber;
a rack gear provided at a lower part of the rail housing, the rack gear including a plurality of teeth arranged in a front to rear direction of the storage chamber;
a storage box configured to be withdrawn from or inserted into the storage chamber;
a rail device connected to the storage box and including a pinion gear that moves together with movement of the storage box, wherein movement of the pinion gear is guided by the plurality of teeth of the rack gear; and
an idle gear including a plurality of teeth arranged adjacent to one another in the front to rear direction, each of the plurality of teeth of the idle gear having a width orthogonal to the front to rear direction that is smaller than a width orthogonal to the front to rear direction of at least one of the plurality of teeth of the rack gear.

2. The refrigerator of claim 1, wherein
each of the plurality of teeth of the idle gear is configured to engage with the pinion gear at a lower height than the plurality of teeth of the rack gear, and
the pinion gear includes a plurality of teeth having a same height and a same width.

3. The refrigerator of claim 1, wherein
each of the plurality of teeth of the rack gear is fixed at a same height so that each of the plurality of teeth of the rack gear is thereby configured to engage with the pinion gear in a same manner, and
each of the plurality of teeth of the idle gear is configured to engage with the pinion gear at a lower height than said same height so that each of the plurality of teeth of the idle gear is thereby configured to engage with the pinion gear in a different manner than the manner in which each of the plurality of teeth of the rack gear engages with the pinion gear.

4. The refrigerator of claim 3, wherein the idle gear is provided adjacent to a rear wall of the storage chamber and at a rear of the plurality of teeth of the rack gear.

5. The refrigerator of claim 1, wherein the idle gear is provided adjacent to a rear wall of the storage chamber and at a rear of the plurality of teeth of the rack gear.

6. A refrigerator comprising:
a main body including a storage chamber;
a rail housing mounted on side wall of the storage chamber;
a rack gear provided at a lower part of the rail housing, the rack gear including a plurality of teeth arranged in a front to rear direction of the storage chamber;
a storage box configured to be withdrawn from or inserted into the storage chamber;
a rail device connected to the storage box and including a pinion gear that moves together with movement of the storage box, the pinion gear including a plurality of teeth having a same height and a same width, wherein movement of the pinion gear is guided by the plurality of teeth of the rack gear; and
an idle gear including a plurality of teeth provided adjacent to a rear wall of the storage chamber, each of the plurality of teeth of the idle gear being configured to engage with the pinion gear at a lower height than the plurality of teeth of the rack gear.

7. The refrigerator of claim 6, wherein the plurality of teeth of the idle gear have a same height when the plurality of teeth of the idle gear are not engaged with the pinion gear.

8. The refrigerator of claim 6, wherein when the plurality of teeth of the idle gear engage with the pinion gear and the pinion gear moves toward the plurality of teeth of the rack gear, a height of each of the plurality of teeth of the idle gear is less than a height of each of the plurality of teeth of the rack gear.

9. The refrigerator of claim 6, wherein when the plurality of teeth of the idle gear engage with the pinion gear and the pinion gear moves away from the plurality of teeth of the rack gear, a height of each of the plurality of teeth of the idle gear is less than a height of each of the plurality of teeth of the rack gear.

10. The refrigerator of claim 6, wherein
the idle gear is provided adjacent to a rear wall of the storage chamber,
an inner end in a width direction of at least one of the plurality of teeth of the rack gear is closer to the side wall of the storage chamber than an inner end in the width direction of each of the plurality of teeth of the idle gear, and
each of the plurality of teeth of the idle gear is substantially triangular in shape.

11. A refrigerator comprising:
a main body including a storage chamber;
a rail housing mounted on side wall of the storage chamber;
a rack gear provided at a lower part of the rail housing, the rack gear including a plurality of teeth arranged in a front to rear direction of the storage chamber;
a storage box configured to be withdrawn from or inserted into the storage chamber;
a rail device connected to the storage box and including a pinion gear that moves together with movement of the storage box, the pinion gear including a plurality of teeth having a same height and a same width, wherein movement of the pinion gear is guided by the plurality of teeth of the rack gear; and
an idle gear including at least one tooth and configured to facilitate a correction of a position of the storage box with respect to the side wall of the storage chamber when the storage box eccentrically moves into or out of the storage chamber,
wherein
the at least one tooth of the idle gear is configured to engage with the pinion gear at a lower height than the plurality of teeth of the rack gear,
an outer end in a width direction of the at least one tooth of the idle gear is closer to the side wall of the storage chamber than an inner end in the width direction of the at least one tooth of the idle gear,
an outer end in a width direction of one tooth of the plurality of teeth of the rack gear is closer to the side wall of the storage chamber than an inner end in the width direction of the one tooth of the plurality of teeth of the rack gear,
the outer end of the one tooth of the plurality of teeth of the rack gear is closer to the side wall of the storage chamber than the outer end of the at least one tooth of the idle gear, and
a flat surface is provided adjacent to the outer end of the at least one tooth of the idle gear in the width direction of the at least one tooth of the idle gear and is provided between the outer end of the at least one tooth of the idle gear and the outer end of the one of the plurality of teeth of the rack gear.

12. The refrigerator of claim 11, wherein
the idle gear includes a plurality of teeth having a same height when the plurality of teeth of the idle gear are not engaged with the pinion gear.

13. The refrigerator of claim 12, wherein
the idle gear is provided adjacent to a rear wall of the storage chamber and at a rear of the plurality of teeth of the rack gear.

14. The refrigerator of claim 11, wherein
the idle gear is provided adjacent to a rear wall of the storage chamber.

15. The refrigerator of claim 11, wherein the at least one tooth of the idle gear is substantially triangular in shape.

16. The refrigerator of claim 11, wherein
the idle gear is provided adjacent to a rear wall of the storage chamber, and
the at least one tooth of the idle gear is substantially triangular in shape.

\* \* \* \* \*

UNITED STATES PATENT AND TRADEMARK OFFICE
CERTIFICATE OF CORRECTION

PATENT NO. : 9,523,533 B2  
APPLICATION NO. : 14/969982  
DATED : December 20, 2016  
INVENTOR(S) : Jeong Man Nam et al.

Page 1 of 1

It is certified that error appears in the above-identified patent and that said Letters Patent is hereby corrected as shown below:

On the Title Page

First Page, Column 2, Assistant Examiner:
Delete "Thomas M Ayres" and insert -- Timothy M Ayres --, therefor.

In the Claims

Column 7, Line 9, Claim 6:
After "on" insert -- a --, therefor.

Column 7, Line 54, Claim 11:
After "on" insert -- a --, therefor.

Signed and Sealed this
Sixteenth Day of May, 2017

Michelle K. Lee
*Director of the United States Patent and Trademark Office*